(12) United States Patent
Kataria (10) Patent No.: US 10,204,152 B2
(45) Date of Patent: Feb. 12, 2019

(54) METHOD AND SYSTEM FOR DETECTING PERSONAL LIFE EVENTS OF USERS

(71) Applicant: Conduent Business Services, LLC, Dallas, TX (US)

(72) Inventor: Saurabh Kataria, Rochester, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 160 days.

(21) Appl. No.: 15/215,684

(22) Filed: Jul. 21, 2016

(65) Prior Publication Data
US 2018/0025069 A1   Jan. 25, 2018

(51) Int. Cl.
| G06F 17/30 | (2006.01) |
|---|---|
| G06F 17/24 | (2006.01) |
| H04L 29/08 | (2006.01) |
| G06N 99/00 | (2010.01) |
| G06Q 50/00 | (2012.01) |

(52) U.S. Cl.
CPC ...... *G06F 17/30598* (2013.01); *G06F 17/241* (2013.01); *G06F 17/30525* (2013.01); *G06N 99/005* (2013.01); *G06Q 50/01* (2013.01); *H04L 67/22* (2013.01)

(58) Field of Classification Search
CPC ............. G06F 17/30702; G06F 17/30598
See application file for complete search history.

(56) References Cited

U.S. PATENT DOCUMENTS

| 9,383,976 B1 * | 7/2016 | Singh ................. G06F 8/34 |
| 9,473,637 B1 * | 10/2016 | Venkatapathy ..... H04M 3/5175 |
| 9,639,902 B2 * | 5/2017 | Huehn ................ G06Q 50/01 |
| 9,792,549 B2 * | 10/2017 | Bornea ............... G06N 5/02 |
| 2011/0313801 A1 * | 12/2011 | Biewald ............. G06Q 10/06 705/7.12 |

(Continued)

FOREIGN PATENT DOCUMENTS

| CN | 103678472 A * | 3/2014 | ............ G06F 17/30 |
| WO | WO 2016012493 A1 * | 1/2016 | ............ G06Q 10/06 |

OTHER PUBLICATIONS

H. Becker, M. Naaman, and L. Gravano. Beyond trending topics: Real-world event identi_cation on twitter. ICWSM, 11:438{441, 2011.

(Continued)

*Primary Examiner* — Hosain T Alam
*Assistant Examiner* — Anthony G Gemignani
(74) *Attorney, Agent, or Firm* — Jones Robb, PLLC (57) ABSTRACT

The disclosed embodiments illustrate methods and systems for detecting personal life events of users. The method includes training classifiers based on a set of features extracted from each of an annotated first set of social media data. The first set of social media is associated with one or more first categories. Further, the first set of social media data are annotated by one or more crowdworkers based on one or more second categories. The method further includes extracting a second set of social media data of one or more users, associated with the one or more first categories, from the one or more social media platforms. The method further includes categorizing the extracted second set of social media data into the one or more second categories by use of the trained classifiers. The categorization is further utilized to detect the personal life events of the one or more users.

20 Claims, 4 Drawing Sheets

(56) References Cited

U.S. PATENT DOCUMENTS

| | | | | |
|---|---|---|---|---|
| 2012/0047219 | A1* | 2/2012 | Feng | G06F 17/3071 709/207 |
| 2013/0097176 | A1* | 4/2013 | Khader | G06Q 30/0251 707/748 |
| 2014/0255886 | A1* | 9/2014 | Wang | G09B 5/00 434/169 |
| 2014/0289253 | A1* | 9/2014 | Natarajan | G06Q 10/101 707/740 |
| 2014/0337257 | A1* | 11/2014 | Chatterjee | G06N 99/005 706/12 |
| 2014/0369597 | A1* | 12/2014 | Shulman | G06K 9/6254 382/159 |
| 2015/0032675 | A1* | 1/2015 | Huehn | G06Q 50/01 706/12 |
| 2015/0347392 | A1* | 12/2015 | Cavalin | G06F 17/277 704/9 |
| 2016/0063993 | A1* | 3/2016 | Dolan | G10L 15/08 704/254 |
| 2016/0092793 | A1* | 3/2016 | Garrow | G06F 17/3053 706/12 |
| 2016/0132924 | A1* | 5/2016 | Thirugnanasundaram | G06Q 30/0252 705/14.5 |
| 2016/0148096 | A1* | 5/2016 | Bornea | G06F 17/277 706/55 |
| 2016/0189057 | A1* | 6/2016 | Rao | G06N 99/005 706/12 |
| 2016/0247205 | A1* | 8/2016 | Ziliacus | G06Q 30/0251 |
| 2016/0275418 | A1* | 9/2016 | Welinder | G06F 17/30598 |
| 2016/0292734 | A1* | 10/2016 | Jia | G06Q 30/0256 |
| 2016/0378760 | A1* | 12/2016 | Braz | G06Q 10/107 707/728 |
| 2017/0063775 | A1* | 3/2017 | Akolkar | G06Q 30/0254 |
| 2017/0076297 | A1* | 3/2017 | Dong | G06Q 30/0201 |
| 2017/0177722 | A1* | 6/2017 | Cavalin | G06F 17/30864 |
| 2017/0315996 | A1* | 11/2017 | Fothergill | G06F 17/30011 |
| 2017/0351816 | A1* | 12/2017 | Fink | G06F 17/28 |
| 2018/0012237 | A1* | 1/2018 | Krasikov | G06Q 30/0201 |
| 2018/0012598 | A1* | 1/2018 | Thirukovalluru | G10L 15/26 |

OTHER PUBLICATIONS

B. Di Eugenio, N. Green, and R. Subba. Detecting life events in feeds from twitter. In ICSC, pp. 274{277, 2013.

T. Sakaki, M. Okazaki, and Y. Matsuo. Earthquake shakes twitter users: real-time event detection by social sensors. In Proceedings of the 19th international conference on World wide web, pp. 851{860. ACM, 2010.

J. Li, A. Ritter, C. Cardie, and E. H. Hovy. Major life event extraction from twitter based on congratulations/condolences speech acts. In Proceedings of the 2014 Conference on Empirical Methods in Natural Language Processing, EMNLP 2014, Oct. 25-29, 2014, Doha, Qatar, A meeting of SIGDAT, a Special Interest Group of the ACL, pp. 1997{2007, 2014.

E. T. K. Sang and J. Bos. Predicting the 2011 dutch senate election results with twitter. In Proceedings of the Workshop on Semantic Analysis in Social Media, pp. 53{60. Association for Computational Linguistics, 2012.

M.-C. De Marnee and C. D. Manning. Stanford typed dependencies manual. URL http://nlp. Stanford.edu/software/dependencies manual. pdf, 2008.

S. Choudhury and H. Alani; "Personal Life Event Detection from Social Media;" pp. 1-6.

* cited by examiner

METHOD AND SYSTEM FOR DETECTING PERSONAL LIFE EVENTS OF USERS

TECHNICAL FIELD

The presently disclosed embodiments are related, in general, to data mining. More particularly, the presently disclosed embodiments are related to a method and a system for processing user data for detecting personal life events of users.

BACKGROUND

With the widespread usage of social media platforms, such as Facebook™, LinkedIn™, Twitter™, and/or Instagram™, millions of registered users are able to connect with each other and express their emotions about various events occurring around them. The events may be real-world events (e.g., earthquakes, floods, elections, and/or the like) or personal life events (e.g., wedding, graduation, employment, and/or the like). For all such events, the registered users may post, share, like, or dislike one or more messages, images, or videos on the social media platforms to express their emotions.

Typically, the real-world events are easy to detect due to the availability of substantial data. However, the personal life events are comparatively difficult to detect due to the limited availability of data. It is also difficult to identify whether the data is about the personal life event of a user, a life event related to a friend of the user or a general event directly or indirectly associated with the user. Nevertheless, the detection of the personal life events of users is equally important, as such detection may be utilized for providing useful recommendations to the users. Therefore, there is a need for a method and a system are needed to efficiently process the user data for detection of personal life events of the users.

Further limitations and disadvantages of the conventional and traditional approaches will become apparent to one skilled in the art, through a comparison of described systems with some aspects of the present disclosure, as set forth in the remainder of the present application and with reference to the drawings.

SUMMARY

According to embodiments illustrated herein, there is provided a method for detecting personal life events of users by a computing server. The method includes extracting, by a data extraction processor at the computing server, a first set of social media data, associated with one or more first categories, from one or more social media platforms over a communication network. The method further includes transmitting, by a transceiver at the computing server, the extracted first set of social media data to one or more crowdworkers over a crowdsourcing platform for annotating the extracted first set of social media data based on one or more second categories. The method further includes extracting, by a feature extraction processor at the computing server, a set of features from each of the annotated first set of social media data. The extracted set of features includes at least a set of dialogue features that is indicative of at least one or more sentiments in the annotated first set of social media data. Further, the method includes training, by a processor at the computing server, one or more first classifiers based on the extracted set of features associated with each of the annotated first set of social media data. The method further includes extracting, by the data extraction processor, a second set of social media data of one or more users, associated with the one or more first categories, from the one or more social media platforms over the communication network. The method further includes categorizing, by the processor, the extracted second set of social media data into the one or more second categories by use of the trained one or more first classifiers. Thereafter, the categorization is further utilized to detect the personal life events of the one or more users.

According to embodiments illustrated herein, there is provided a system for detecting personal life events of users. The system includes one or more processors that are configured to extract a first set of social media data, associated with one or more first categories, from one or more social media platforms over a communication network. The one or more processors are further configured to transmit the extracted first set of social media data to one or more crowdworkers over a crowdsourcing platform for annotating the extracted first set of social media data based on one or more second categories. The one or more processors are further configured to extract a set of features from each of the annotated first set of social media data. The extracted set of features includes at least a set of dialogue features that is indicative of at least one or more sentiments in the annotated first set of social media data. The one or more processors are further configured to train one or more first classifiers based on the extracted set of features associated with each of the annotated first set of social media data. The one or more processors are further configured to extract a second set of social media data of one or more users, associated with the one or more first categories, from the one or more social media platforms over the communication network. The one or more processors are further configured to categorize the extracted second set of social media data into the one or more second categories by use of the trained one or more first classifiers. Thereafter, the categorization is further utilized to detect the personal life events of the one or more users.

According to embodiments illustrated herein, there is provided a computer program product for use with a computing device. The computer program product comprises a non-transitory computer readable medium storing a computer program code for detecting personal life events of users. The computer program code is executable by one or more processors to extract a first set of social media data, associated with one or more first categories, from one or more social media platforms over a communication network. The computer program code is further executable by the one or more processors to transmit the extracted first set of social media data to one or more crowdworkers over a crowdsourcing platform for annotating the extracted first set of social media data based on one or more second categories. The computer program code is further executable by the one or more processors to extract a set of features from each of the annotated first set of social media data. The extracted set of features includes at least a set of dialogue features that is indicative of at least one or more sentiments in the annotated first set of social media data. The computer program code is further executable by the one or more processors to train one or more first classifiers based on the extracted set of features associated with each of the annotated first set of social media data extract a second set of social media data of one or more users, associated with the one or more first categories, from the one or more social media platforms over the communication network. The computer program code is further executable by the one or more processors to extract a second set of social media data of one or more users, associated with the one or more first categories, from the one or more social media platforms over the communication network. The computer program code is further executable by the one or more processors to categorize the extracted second set of social media data into the one or more second categories by use of the trained one or more first classifiers. Thereafter, the categorization is further utilized to detect the personal life events of the one or more users.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions :The following terms shall have, for the purposes of this application, the meanings set forth below.

A "user-computing device" refers to a computer, a device (that includes one or more processors/microcontrollers and/or any other electronic components), and/or a system (that performs one or more operations according to one or more programming instructions/codes) associated with a user. In an embodiment, the user may utilize the user-computing device to communicate with another user over one or more social media platforms. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "crowdworker-computing device" refers to a computer, a device (that includes one or more processors/microcontrollers and/or any other electronic components), or a system (that performs one or more operations according to one or more programming instructions/codes) associated with a crowdworker. In an embodiment, the crowdworker may utilize the crowdworker-computing device to receive a request for a task, such as a request for annotating user data associated with one or more social media platforms. Further, the crowdworker may utilize the crowdworker-computing device to transmit the completed task and associated responses to a crowdsourcing platform. Examples of the crowdworker-computing device may include, but are not limited to, a desktop computer, a laptop, a personal digital assistant (PDA), a mobile device, a smartphone, and a tablet computer (e.g., iPad® and Samsung Galaxy Tab®).

A "social media platform" refers to a communication medium through which one or more registered users interact with each other. Further, the one or more registered users may post, share, like, or dislike one or more messages, images, videos, and/or the like on social media platforms. Examples of the social media platforms include, but are not limited to, social networking websites (e.g., Facebook™, LinkedIn™, Twitter™, Instagram™, Google+™, and so forth), web-blogs, web-forums, community portals, online communities, or online interest groups.

A "crowdsourcing platform" refers to a business application, wherein a broad, loosely defined external group of people, a community, or an organization provides solutions as outputs for any specific task processes received by the application as an input. In an embodiment, the business application may be hosted online on a web portal (e.g., crowdsourcing platform servers). Various examples of the crowdsourcing platform include, but are not limited to, Amazon Mechanical Turk or Crowd Flower.

"One or more crowdworkers" refer to a worker or a group of workers who may perform one or more tasks, such as annotating a set of social media data into one or more categories. The one or more crowdworkers may utilize one or more crowdworker-computing devices to perform the task. Further, the one or more crowdworker may receive incentive(s) based on at least validation of the task.

A "user" refers to an individual who is a member of one or more social media platforms. In an embodiment, the user may be registered with a social media platform to become the member of the social media platform. During registration, the user provides information such as name, gender, location, age, education, profession, one or more images, interests/hobbies, and so forth. In an embodiment, the user may utilize the one or more social media platforms to communicate with one or more other users. Further, the user may utilize the one or more social media platforms to post, share, like, or dislike one or more messages on the one or more social media platforms. The one or more messages may correspond to one or more personal life events of the user or the one or more other users.

A "personal life event" of a user refers to an event, such as marriage, education, employment, and/or the like, directly associated with the life of the user.

"One or more keywords" refer to one or more words that may be representative of one or more first categories. For example, a first category correspond to a marriage-related event category. In such a case, one or more keywords may include one or more synonyms and one or more other words that are associated with the word "marriage." For example, "marriage," "wedding," "matrimony," "bride," "groom," "nuptial," and/or the like.

"Social media data" refers to data, such as one or more messages, images, videos, and/or the like, that may have been posted, shared, liked, and/or disliked by a user on one or more social media platforms. In an embodiment, the social media data may further comprise data pertaining to one or more replies, likes, and/or dislikes provided by the user on one or more messages, images, videos, and/or the like that are associated with one or more other users.

A "first set of social media data" refers to a set of historical social media data that is extracted from one or more social media platform servers to train one or more classifiers. In an embodiment, the first set of social media data is extracted based on one or more keywords associated with one or more event categories, such as a marriage-related event category, an employment-related event category, and/or an education-related event category. In an embodiment, the extracted first set of social media data may correspond to a predefined time period. Further, prior to the training of the one or more classifiers, the first set of social media data may be transmitted to one or more crowdworkers for annotation.

A "second set of social media data" of a user refers to a set of social media data that is posted, shared, liked, and/or disliked by the user on one or more social media platforms. Further, the second set of social media data may be utilized to detect one or more personal life events of the user. In an embodiment, the second set of social media data is extracted based on one or more keywords associated with one or more event categories, such as a marriage-related event category, an employment-related event category, and/or an education-related event category.

"One or more first categories" refer to one or more groups or classes that are representative of one or more of one or more personal events, one or more social events, and one or more professional events. For example, the one or more first categories may be associated with marriage, education, employment and/or the like.

"One or more second categories" refer to one or more groups or classes that are representative of whether an event in a message, extracted from a social media profile of a user, is associated with the user or not. In an embodiment, the one or more second categories may correspond to at least one of self-associated event category, other-associated event category, and/or generically-associated event category. In an embodiment, the self-associated event category may refer to scenario where one or more events in the extracted social media data is associated with the user only. In an embodiment, the other-associated event category may refer to scenario where the one or more events in the extracted social media data is associated with one or more other users. In an embodiment, the generically-associated event category may refer to scenario where it may not be identified whether the one or more events in the extracted social media data is associated the user or the one or more other users.

A "set of features" refers to a set of characteristics that are extracted from social media data. For example, the set of features may include one or more of, but are not limited to, a set of dialogue features, a set of language features, a set of Part-of-Speech (POS) features, a set of dependency features, and a set of mention features. In an embodiment, the set of dialogue features may be indicative of at least one or more sentiments in the social media data. In an embodiment, the set of language features may correspond to an n-gram feature vector generated from the social media data. In an embodiment, the set of POS features may correspond to an n-gram POS vectors generated from the social media data. In an embodiment, the set of dependency features may be determined based on at least a dependency relationship between at least a plurality words in the social media data. In an embodiment, the set of mention features may be determined based on at least a mention of demographic attributes of the one or more users in the social media data.

"One or more classifiers" refer to one or more statistical and/or mathematical models that may be configured to classify a set of social media data into one or more pre-defined categories. Such classification may be utilized to detect personal life events of one or more users. In an embodiment, prior to the classification, the one or more classifiers may be trained based on a set of features associated with a known set of social media data. Examples of the one or more classifiers may include, but are not limited to, a Logistic Regression, a Random Forest (RF) model, a Gaussian Naive Bayes (Gaussian NB), and/or a Bernauli Naive Bayes (Bernauli NB).

"Training" refers to a process of updating/tuning a classifier using at least features that are extracted from a set of data, such that the trained classifier may be able to predict at least one category, among one or more categories, in which another set of data may be categorized. Such categorization of the data, by the trained classifier, may further be utilized to predict personal life events of users.

Figure 1:
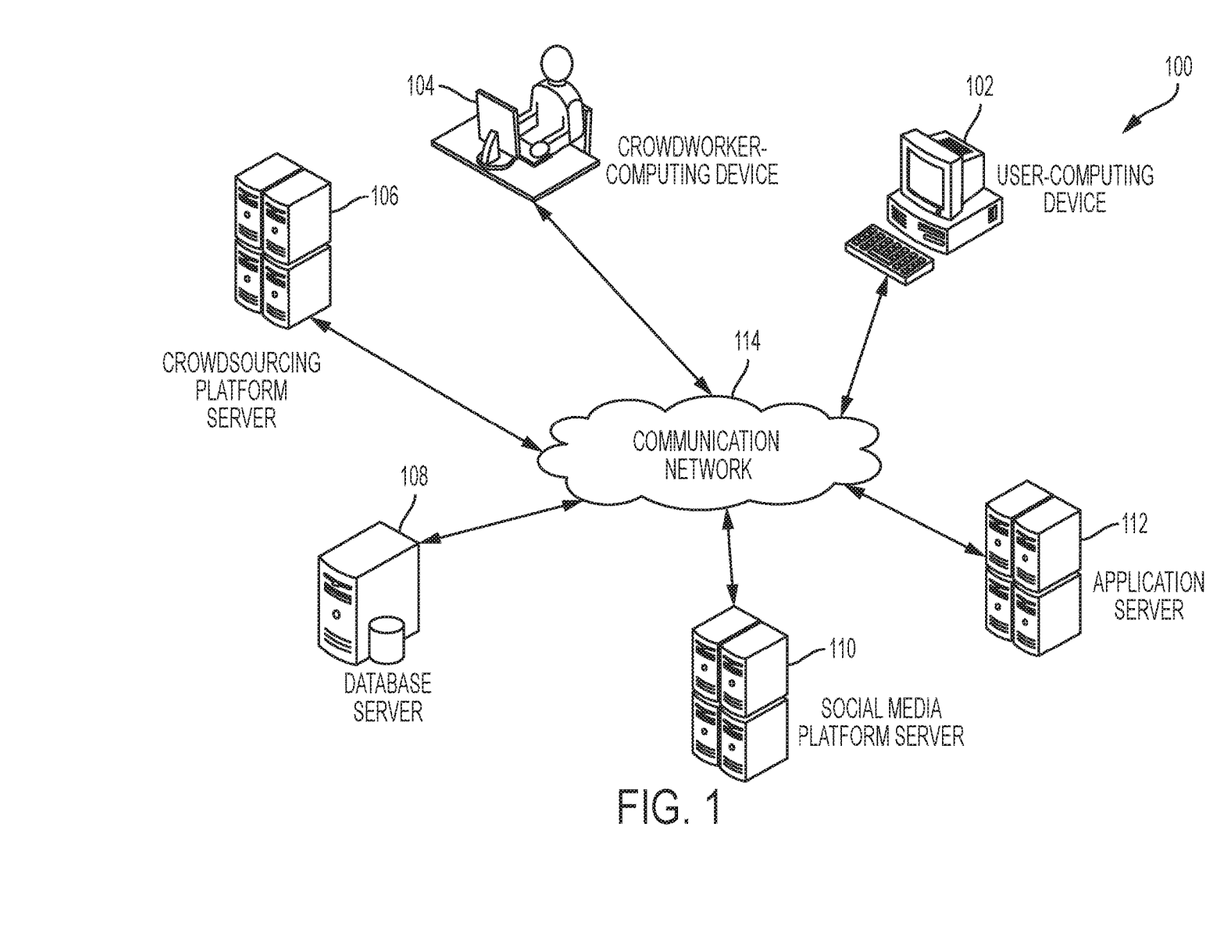
FIG. 1 is a block diagram that illustrates a system environment in which various embodiments of a method and a system may be implemented.

FIG. 1 is a block diagram of a system environment in which various embodiments may be implemented. With reference to FIG. 1, there is shown a system environment 100 that includes a user-computing device 102, a crowd-worker-computing device 104, a crowdsourcing platform server 106, a database server 108, a social media platform server 110, and an application server 112. Various devices in the system environment 100 may be interconnected over the communication network 114. For simplicity, FIG. 1 shows one user-computing device 102, one crowdworker-computing device 104, one crowdsourcing platform server 106, one database server 108, one social media platform server 110, and one application server 112. However, it will be apparent to a person having ordinary skill in the art that the disclosed embodiments may also be implemented using multiple user-computing devices, multiple crowdworker computing devices, multiple crowdsourcing platform servers, multiple social media platform servers, and multiple application servers, without departing from the scope of the disclosure.

The user-computing device 102 may refer to a computing device (associated with a user) that may be communicatively coupled to the communication network 114. The user-computing device 102 may include one or more processors and one or more memory units. The one or more memory units may include computer-readable codes, instructions, or programs that are executable by the one or more processors to perform one or more pre-defined operations.

In an embodiment, the user may utilize the user-computing device 102 to connect with one or more social media platform servers, such as the social media platform server 110. Prior to the connection, the user may connect the user-computing device 102 over a network, such as the communication network 114. After this, the user may open a web browser, such as a Mozilla™ Firefox™ web browser. Thereafter, the user may launch a social media platforms, such as Facebook™, LinkedIn™, Twitter™, and/or Instagram™, on the user-computing device 102. In another embodiment, the user may launch the social media platforms, such as Facebook™, LinkedIn™, Twitter™, and/or Instagram™, on the user-computing device 102 by using a web application installed on the user-computing device 102. Further, the user may utilize one or more input devices connected with the user-computing device 102 to input login credentials (e.g., user identifier and password). Based on the validation of the log-in credentials, the user may view his/her social media profile and related information on the user-computing device 102. Further, the user may utilize the one or more input devices to update his/her social media profile information. Further, the user may utilize the one or more input devices to post or share social media data (i.e., one or more messages, one or more images, one or more videos, and/or the like). The social media data may correspond to at least one of one or more personal events, one or more social events, and/or one or more professional events that are associated with the user. Further, in an embodiment, the user may utilize the one or more input devices to share, like, or dislike social media data that are posted by one or more other users.

The user-computing device 102 may correspond to various types of computing devices, such as, but not limited to, a desktop computer, a laptop, a PDA, a mobile device, a smartphone, or a tablet computer (e.g., iPad® and Samsung Galaxy Tab.

A person having ordinary skill in the art will understand that the scope of the disclosure is not limited to a single user utilizing the user-computing device 102 to perform one or more activities on the one or more social media platforms. In an embodiment, the one or more activities may be performed by more than one user, by use of corresponding user-computing devices, such as the user-computing device 102, without limiting the scope of the disclosure.

The crowdworker-computing device 104 may refer to a computing device (associated with a crowdworker) that may be communicatively coupled to the communication network 114. The crowdworker-computing device 104 may include one or more processors and one or more memory units. The one or more memory units may include computer-readable codes, instructions, or programs that are executable by the one or more processors to perform one or more pre-defined operations. In an embodiment, the crowdworker-computing device 104 may include one or more pre-installed web applications or software programs, which may be utilized by the crowdworker to perform the one or more pre-defined operations.

In an embodiment, the crowdworker may utilize the crowdworker-computing device 104 to receive or extract a task from the crowdsourcing platform server 106 or the application server 112 over the communication network 114. The task may comprise a first set of social media data extracted by the application server 112 from the one or more social media platforms, such as the social media platform server 110. The first set of social media data may be associated with one or more first categories, such as one or more personal events, one or more social events, and/or one or more professional events. The task may further comprise one or more associated instructions that may be required to perform the task. For example, based on an associated instruction, a crowdworker may be required to annotate each of a first set of social media data based on one or more second categories. The one or more second categories may correspond to at least one of a self-associated event category, other-associated event category, and/or a generically associated event category.

After receiving the task and the one or more associated instructions, the crowdworker may utilize the crowdworker-computing device 104 to process the task to determine required response of the task. Thereafter, the crowdworker may utilize the crowdworker-computing device 104 to transmit the determined response of the task to the crowdsourcing platform server 106 or the application server 112 over the communication network 114.

The crowdworker-computing device 104 may correspond to various types of computing devices, such as, but not limited to, a desktop computer, a laptop, a PDA, a mobile device, a smartphone, or a tablet computer (e.g., iPad® and Samsung Galaxy Tab®).

A person having ordinary skill in the art will understand that the scope of the disclosure is not limited to the single crowdworker utilizing the crowdworker-computing device 104 to process the task. In an embodiment, the task may be performed by more than one crowdworker, by use of corresponding crowdworker-computing devices, such as the crowdworker-computing device 104, without limiting the scope of the disclosure.

The database server 108 may refer to a computing device that may be communicatively coupled to the communication network 114. The database server 108 may be configured to store the first set of social media data and the second set of social media data extracted by the application server 112. Further, the database server 108 may be further configured to store one or more annotations associated with each of the first set of social media data. The one or more annotations are provided by one or more crowdworkers. The database server 108 may be further configured to store a set of features, extracted by the application server 112, for each of the annotated first set of social media data.

Further, in an embodiment, the database server 108 may receive one or more queries from the application server 112 to retrieve the first set of social media data, the second set of social media data, the one or more annotations associated with each of the first set of social media data, and/or the extracted set of features. For querying the database server 108, one or more querying languages may be utilized, such as, but are not limited to, SQL, QUEL, DMX and so forth. Further, the database server 108 may be realized through various technologies, such as, but not limited to, Microsoft® SQL server, Oracle®, and MySQL®. In an embodiment, the application server 112 may connect to the database server 108 using one or more protocols, such as, but not limited to, ODBC protocol and JDBC protocol.

The social media platform server 110 may be configured to host one or more social media platforms, such as, but not limited to, one or more social media websites (e.g., Facebook™, LinkedIn™, Twitter™, Instagram™, and so forth), a chat/messaging application, a web-based blog, web-forums, a community portal, an online community, or an online interest group. In an embodiment, one or more users may register themselves with the one or more social media platforms prior to the utilization of one or more services associated with the one or more social media platforms.

The social media platform server 110 may refer to a communication medium through which the one or more users may interact with the one or more other users, who are also registered on the one or more social media platforms. Further, apart from interacting with one another, the one or more users and the one or more other users may post the social media data (e.g., one or more messages, one or more images, one or more videos, and/or the like) on the social media platforms. Further, in an embodiment, the one or more users may share and/or tag the social media data with the one or more other users on the social network platforms. Further, the one or more users may interact with the one or more other users in reference to the social media data.

Further, in an embodiment, the social media platform server 110 may receive one or more queries from the application server 112 to extract the first set of social media data and the second set of social media data. For querying the social media platform server 110, one or more querying languages such as, but not limited to, SQL, QUEL, or DMX, may be utilized. In an embodiment, the social media platform server 110 may be realized through various web-based technologies, such as, a Java web-framework, a .NET framework, a PHP framework, or any other such web-application framework.

The application server 112 may refer to a computing device or a software framework hosting an application or a software service that may be communicatively coupled to the communication network 114. In an embodiment, the application server 112 may be implemented to execute procedures such as, but not limited to, programs, routines, or scripts stored in one or more memory units for supporting the hosted application or the software service. In an embodiment, the hosted application or the software service may be configured to perform one or more pre-defined operations. The application server 112 may be configured to detect one or more personal events of the one or more users. Prior to the detection of the one or more personal events of the one or more users, the application server 112 may be configured to extract the first set of social media data associated with the one or more first categories from the one or more social media platforms over a communication network 114. In an embodiment, the application server 112 may be further configured to transmit the extracted first set of social media data to the one or more crowdworkers over the crowdsourcing platform server 106 for annotating the extracted first set of social media data based on one or more second categories. In an embodiment, the application server 112 may be further configured to extract the set of features from each of the annotated first set of social media data. The extracted set of features includes at least a set of dialogue features, a set of language features, a set of Part-of-Speech (POS) features, a set of dependency features, and a set of mention features. In an embodiment, the application server 112 may be further configured to train one or more first classifiers based on the extracted set of features associated with each of the annotated first set of social media data. Thereafter, the application server 112 may be configured to extract the second set of social media data of the one or more users from the one or more social media platforms over the communication network 114. The second set of social media data may be associated with the one or more first categories. Further, the application server 112 may utilize the trained one or more first classifiers to categorize the extracted second set of social media data into the one or more second categories. The categorization of the second set of social media data is utilized to detect the one or more personal life events of the one or more users. The various functionalities of the application server 112 have been explained later in detail in conjunction with FIG. 3 and FIG. 4.

The application server 112 may be realized through various types of application servers, such as, but not limited to, a Java application server, a .NET framework application server, a Base4 application server, a PHP framework application server, or other such application server framework. An embodiment of the structure of the application server 112 has been discussed later in FIG. 2.

The communication network 114 may include a medium through which one or more devices, such as the user-computing device 102 and the crowdworker-computing device 104, and one or more servers, such as the crowdsourcing platform server 106, the database server 108, the social media platform server 110, and the application server 112, may communicate with each other. Examples of the communication network 114 may include, but are not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 114, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), Light Fidelity (Li-Fi), and/or other cellular communication protocols or Bluetooth (BT) communication protocols.

Figure 2:
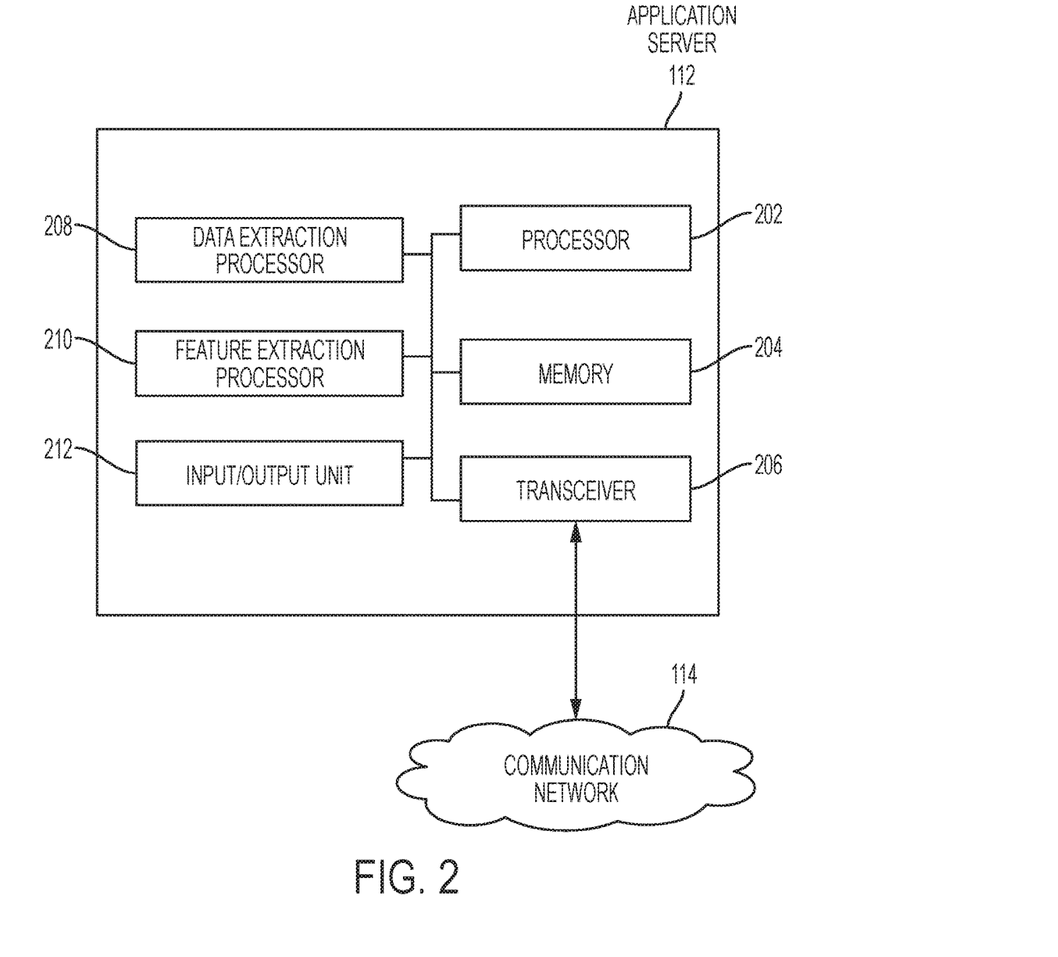
FIG. 2 is a block diagram that illustrates a computing server configured to detect personal life events of users, in accordance with at least one embodiment.

FIG. 2 is a block diagram that illustrates a computing server, in accordance with at least one embodiment. With reference to FIG. 2, there is shown the computing server, such as the application server 112 that has been described in conjunction with FIG. 1. The application server 112 may include one or more processors, such as a processor 202, one or more memory units, such as a memory 204, one or more transceivers, such as a transceiver 206, one or more data extraction processors, such as a data extraction processor 208, one or more feature extraction processors, such as a feature extraction processor 210, and one or more input/output (I/O) units, such as an I/O unit 212. The processor 202 is communicatively coupled to the memory 204, the transceiver 206, the data extraction processor 208, the feature extraction processor 210, and the I/O unit 212.

A person with ordinary skills in the art will appreciate that the scope of the disclosure is not limited to the components as described herein, and other specialized circuitries can also be utilized to perform the various functionalities, without any deviation from the scope of the disclosure.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute one or more sets of instructions/programs/codes/scripts stored in the memory 204 to perform one or more pre-defined operations of the application server 112 to detect the one or more personal life events of the one or more users. Examples of the one or more pre-defined operations may include training one or more first classifiers based on an extracted set of features associated with each of an annotated first set of social media data. Further, the processor 202 may utilize the trained one or more first classifiers to determine one or more personal life events of one or more users by use of a corresponding second set of social media data. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more sets of machine codes, and/or computer programs having at least one code section executable by the processor 202, the data extraction processor 208, or the feature extraction processor 210. The memory 204 may store the one or more sets of instructions that are executable by the processor 202, the transceiver 206, the data extraction processor 208, the feature extraction processor 210, and the I/O unit 212. In an embodiment, the memory 204 may include one or more buffers (not shown). The one or more buffers may store the extracted first set of social media data, the extracted second set of social media data, and/or the annotated first set of social media data. The one or more buffers may further store the set of features extracted from the annotated first set of social media data. Some of the commonly known memory implementations include, but are not limited to, a random access memory (RAM), a read only memory (ROM), a hard disk drive (HDD), and a secure digital (SD) card. It will be apparent to a person having ordinary skill in the art that the one or more instructions stored in the memory 204 may enable the hardware of the application server 112 to perform the one or more pre-defined operations, without deviating from the scope of the disclosure.

The transceiver 206 may comprise suitable logic, circuitry, interface, and/or code that may be configured to communicate with the one or more devices, such as the user-computing device 102 and the crowdworker-computing device 104, and/or one or more servers, such as the crowdsourcing platform server 106, the database server 108, and the social media platform server 110. The transceiver 206 may be configured to transmit or receive the one or more sets of instructions, queries, and/or other information to/from various components of the system environment 100. The transceiver 206 may implement one or more known technologies to support wired or wireless communication with the communication network 114. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as a Global System for Mobile Communications (GSM), an Enhanced Data GSM Environment (EDGE), a wideband code division multiple access (W-CDMA), a code division multiple access (CDMA), a time division multiple access (TDMA), a Bluetooth, a Wireless Fidelity (Wi-Fi) (e.g., IEEE 802.11a, IEEE 802.11b, IEEE 802.11g and/or IEEE 802.11n), a voice over Internet Protocol (VoIP), a Wi-MAX, a protocol for email, an instant messaging, and/or a Short Message Service (SMS).

The data extraction processor 208 may comprise suitable logic, circuitry, and/or interfaces that are configured to execute the one or more sets of instructions stored in the memory 204 to perform one or more associated operations. For example, the data extraction processor 208 may be configured to extract a first set of social media data and a second set of social media data, associated with one or more first categories, from one or more social media platforms, such as the social media platform server 110 over the communication network 114. The data extraction processor 208 may be implemented based on a number of processor technologies known in the art. Examples of the data extraction processor 208 include, but are not limited to, a word processor, an X86-based processor, a RISC processor, an ASIC processor, and/or a CISC processor.

A person having ordinary skill in the art will appreciate that the scope of the disclosure is not limited to the processor 202 and the data extraction processor 208 as separate entities. In an embodiment, the one or more associated operations of the data extraction processor 208 may be realized by the processor 202, or vice-versa without departing from the spirit of the disclosure.

Further, a person having ordinary skill in the art will understand that the scope of the disclosure is not limited to realizing the data extraction processor 208 as a hardware component. In an embodiment, the data extraction processor 208 may be implemented as a software module included in computer program code (stored in the memory 204), which may be executable by the processor 202 to perform the one or more associated operations of the data extraction processor 208.

The feature extraction processor 210 may comprise suitable logic, circuitry, and/or interfaces that are configured to execute the one or more sets of instructions stored in the memory 204 to perform one or more associated operations. For example, the feature extraction processor 210 may be configured to extract a set of features from each of an annotated first set of social media data and/or the extracted second set of social media data. The set of features includes at least a set of dialogue features, a set of language features, a set of POS features, a set of dependency features, and a set of mention features. In an embodiment, the feature extraction processor 210 may utilize one or more natural processing techniques known in the art to extract the set of features. In an embodiment, the feature extraction processor 210 may be implemented based on a number of processor technologies known in the art. Examples of the feature extraction processor 210 include, but are not limited to, a word processor, an X86-based processor, a RISC processor, an ASIC processor, and/or a CISC processor.

A person having ordinary skill in the art will understand that the scope of the disclosure is not limited to realizing the processor 202 and the feature extraction processor 210 as separate entities. In an embodiment, the feature extraction processor 210 may be implemented within the processor 202, without departing from the scope of the disclosure.

A person having ordinary skill in the art will understand that the scope of the disclosure is not limited to realizing the data extraction processor 208 and the feature extraction processor 210 as separate entities. In an embodiment, the feature extraction processor 210 may be implemented within the data extraction processor 208, without departing from the scope of the disclosure.

Further, a person having ordinary skill in the art will understand that the scope of the disclosure is not limited to realizing the feature extraction processor 210 as a hardware component. In an embodiment, the feature extraction processor 210 may be implemented as a software module included in computer program code (stored in the memory 204), which may be executable by the processor 202 to perform the one or more associated operations of the feature extraction processor 210.

The I/O unit 212 may comprise suitable logic, circuitry, interfaces, and/or code that may be operable to transmit/receive the one or more sets of instructions, queries, and/or other information to/from various components of the system environment 100, through the transceiver 206 over the communication network 114. For example, the I/O unit 212 may be configured to transmit the first set of social media data to one or more crowdworkers for annotations, through the transceiver 206 over the communication network 114. Further, the I/O unit 212 may be configured to receive the annotated first set of social media data from one or more crowdworker-computing devices, such as the crowdworker-computing device 104, through the transceiver 206 over the communication network 114. Further, the I/O unit 212 may be configured to render a recommendation of one or more products/services on a user interface displayed on a display screen of the user-computing device 102 associated with each of the one or more users, based on at least the detected one or more personal life events of the one or more users, over the communication network 114. The I/O unit 212 may be operable to communicate with the processor 202, the memory 204, the transceiver 206, the data extraction processor 208 and the feature extraction processor 210. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

Figure 3:
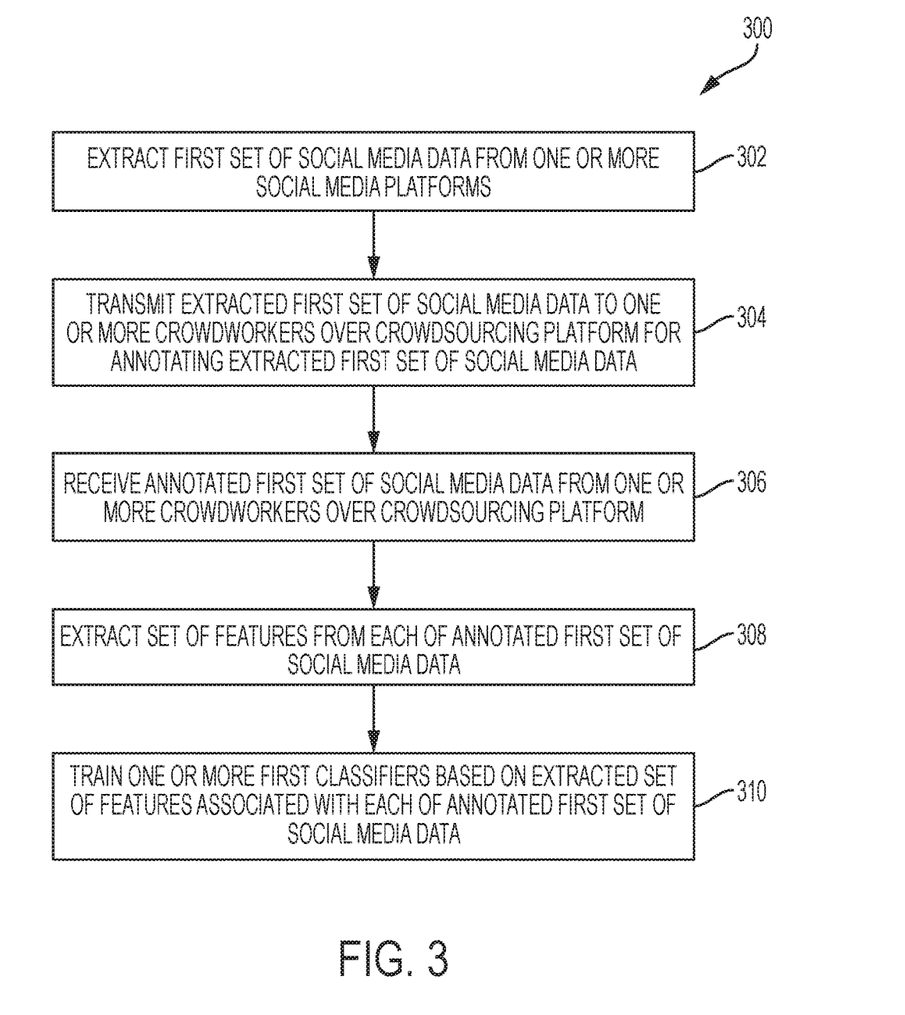
FIG. 3 is flowchart that illustrates a method for training classifiers for classifying social media data of users, in accordance with at least one embodiment.

FIG. 3 is a flowchart that illustrates a method for training classifiers for classifying social media data of users, in accordance with at least one embodiment. With reference to FIG. 3, there is shown a flowchart 300 that has been described in conjunction with FIG. 1 and FIG. 2. A person having ordinary skill in the art will understand that one or more examples, as described in the flowchart 300 in FIG. 3, are for illustrative purpose and should not be construed to limit the scope of the disclosure.

At step 302, the first set of social media data is extracted from the one or more social media platforms. In an embodiment, the data extraction processor 208 may be configured to extract the first set of social media data from the one or more social media platforms, such as the social media platform server 110, over the communication network 114. The extracted first set of social media data may comprise one or more sets of historical social media data that are associated with the users of the one or more social media platforms, such as Facebook™, LinkedIn™, Twitter™, Instagram™, Google+™, and/or the like. Further, the extracted first set of social media data may be associated with the one or more first categories. The one or more first categories may correspond to one or more groups or classes that are representative of at least one of one or more personal events, one or more social events, and one or more professional events. For example, the one or more first categories may be associated with marriage, education, employment, and/or the like.

In an embodiment, the data extraction processor 208 may be configured to extract the first set of social media data from the one or more social media platforms by use of one or more keywords that are associated with the one or more first categories. For example, a first category corresponds to an employment-related event category. In such a case, one or more keywords may include one or more synonyms and one or more other words that are associated with the word "employment." For example, "employment," "employer," "employee," "job," "service," "workforce," and/or the like. In an embodiment, the data extraction processor 208 may generate a search string or query based on the one or more keywords. Further, the data extraction processor 208 may transmit the generated search string or query to the one or more social media platforms, such as the social media platform server 110, over the communication network 114 to extract the first set of social media data.

Further, in an embodiment, the extracted first set of social media data may be associated with a pre-defined time period, as defined by a requestor or an administrator. The data extraction processor 208 may be configured to compare a timestamp of each data item in one or more sets of social media data with the pre-defined time period. In case the data extraction processor 208 determines that the timestamp of each of the one or more sets of social media data is within the pre-defined time period, the data extraction processor 208 may extract the one or more sets of social media data as the first set of social media data.

Further, in an embodiment, the data extraction processor 208 may be configured to extract a set of surrounding data and a set of conversation data associated with the extracted first set of social media data. The set of surrounding data corresponds to one or more sets of social media data that may have been posted, shared, liked, or disliked by a social media user before and/or after a pre-defined time of each of the extracted first set of social media data. For example, a social media user posted a message, say "XYZ," on a social media platform, such as Facebook™, on "May 25, 2016." In such a case, the data extraction processor 208 may be configured to extract all messages that were posted, shared, liked, and/or disliked by the social media user before and/or after a pre-defined time, say two days, of the posted message "XYZ." Thus, the data extraction processor 208 may extract all the messages between "May 23-24, 2016" and "May 26-27, 2016." All the extracted messages may be referred to as the set of surrounding data. Further, the set of conversation data corresponds to one or more sets of social media data that were posted, shared, liked, and/or disliked by one or more social media users in response to each of the extracted first set of social media data. For example, a social media user posted a message, say "ABC," on a social media platform, such as Facebook™. Thereafter, one or more other social media users who are known to or otherwise acquainted with the social media user may have responded through one or more messages in response to the posted message "ABC". Such one or more messages may be referred to as the set of conversation data. Hereinafter, the extracted first set of social media data, the extracted set of surrounding data corresponding to each of the extracted first set of social media data, and the extracted set of conversation data corresponding to each of the extracted first set of social media data have been collectively referred to as the extracted first set of social media data.

Further, in an embodiment, the processor 202, in conjunction with the data extraction processor 208, may be configured to remove noise data from the extracted first set of social media data. The noise data may comprise one or more sets of social media data that are not associated with the one or more first categories. After removing the noise data from the extracted first set of social media data, the processor 202 may store the extracted first set of social media data in a storage device, such as the database server 108 or the memory 204.

At step 304, the extracted first set of social media data is transmitted to the one or more crowdworkers over the crowdsourcing platform server 106 for annotating the extracted first set of social media data. In an embodiment, the processor 202, in conjunction with the transceiver 206, may be configured to transmit the extracted first set of social media data to the one or more crowdworkers over the crowdsourcing platform server 106 for annotating the extracted first set of social media data. Prior to transmitting the extracted first set of social media data to the one or more crowdworkers, the processor 202 may include one or more data samples in the extracted first set of social media data. The one or more data samples may correspond to one or more sets of social media data, such that the one or more second categories of the one or more data samples is known to the processor 202. Thereafter, the processor 202, in conjunction with the transceiver 206, may transmit the extracted first set of social media data (that also comprises the one or more data samples) to the one or more crowdworkers. The one or more crowdworkers may utilize their corresponding crowdworker-computing devices, such as the crowdworker-computing device 104, to receive the extracted first set of social media data through the crowdsourcing platform server 106 over the communication network 114.

Further, in an embodiment, the processor 202, in conjunction with the transceiver 206, may be configured to transmit one or more sets of associated instructions to the one or more crowdworkers over the crowdsourcing platform server 106. The one or more crowdworkers may require the one or more sets of associated instructions to annotate the extracted first set of social media data. For example, based on an associated instruction, one or more crowdworkers may be required to annotate each of the extracted first set of social media data based on one or more second categories. The one or more second categories may correspond to at least one of a self-associated event category, other-associated event category, and/or a generically associated event category. In such a scenario, the one or more crowdworkers may categorize each of the extracted first set of social media data into one or more of the one or more second categories. For example, for a post "User-1: My friend Christine is getting married soon, so happy for her," the one or more crowdworkers may categorize it in other-associated event category. After annotating the extracted first set of social media data, the one or more crowdworkers may utilize their corresponding crowdworker-computing devices, such as the crowdworker-computing device 104, to submit the annotated first set of social media data to the crowdsourcing platform server 106. The crowdsourcing platform server 106 may further transmit the annotated first set of social media data to the processor 202 over the communication network 114.

At step 306, the annotated first set of social media data is received from the one or more crowdworkers over the crowdsourcing platform server 106. In an embodiment, the transceiver 206 may be configured to receive the annotated first set of social media data from the one or more crowdworkers over the crowdsourcing platform server 106. Further, in an embodiment, the processor 202 may be configured to validate the received annotated first set of social media data based on at least the validation of the one or more data samples that were included in the extracted first set of social media data. In an embodiment, the annotated first set of social media data received from each of the one or more crowdworkers are accepted only when the processor 202 determines that the validation of the one or more data samples is above a pre-defined threshold value. After validating the received annotated first set of social media data, the transceiver 206 may store the validated annotated first set of social media data in the storage device, such as the database server 108 or the memory 204. In an embodiment, the storage of the validated annotated first set of social media data may be based on at least the one or more second categories. Hereinafter, the validated annotated first set of social media data has been referred to as the annotated first set of social media data.

At step 308, the set of features is extracted from each of the annotated first set of social media data. In an embodiment, the feature extraction processor 210 may be configured to extract the set of features from each of the annotated first set of social media data. The set of features, extracted from each of the annotated first set of social media data associated with each of the one or more second categories, may include one or more of the set of dialogue features, the set of language features, the set of POS features, the set of dependency features, and the set of mention features.

In an embodiment, the feature extraction processor 210 may be configured to determine the set of dialogue features from each of the annotated first set of social media data associated with each of the one or more second categories. The set of dialogue features may represent at least one or more sentiments in each of the annotated first set of social media data. The one or more sentiments may correspond to one or more of compliments, announcements, greetings, thanks, and/or the like. In an embodiment, the one or more sentiments, such as announcing or thanking, may correspond to a second category, such as a self-associated event category. Similarly, the one or more sentiments, such as compliments or greetings, may correspond to a second category, such as other-associated event category.

Prior to the determination of the set of dialogue features, the processor 202 may be configured to segregate the annotated first set of social media data into a first portion of annotated first set of social media data and a second portion of annotated first set of social media data. The segregation of the annotated first set of social media data may be based on a pre-defined value, as defined by the requestor or the administrator. For example, a pre-defined value may correspond to ratio, such as "1:2." In such a case, the processor 202 may determine the first portion of annotated first set of social media data as $\frac{1}{3}^{rd}$ of the annotated first set of social media data. The processor 202 may determine the second portion of annotated first set of social media data as the remaining annotated first set of social media data, i.e., $\frac{2}{3}^{rd}$ of the annotated first set of social media data. After the segregation, the processor 202, in conjunction with the transceiver 206, may be configured to transmit the first portion of annotated first set of social media data to the one or more crowdworkers over the crowdsourcing platform server 106. The one or more crowdworkers may be instructed to annotate each of the first portion of annotated first set of social media data based on identification of the one or more sentiments in each of the first portion of annotated first set of social media data.

After annotating the first portion of annotated first set of social media data based on the one or more sentiments, the one or more crowdworkers may utilize the corresponding crowdworker-computing devices, such as the crowdworker-computing device 104, to transmit the one or more identified sentiments in each of the first portion of annotated first set of social media data. The transceiver 206 may receive the identified one or more sentiments in each of the first portion of annotated first set of social media data through the crowdsourcing platform server 106 over the communication network 114. Thereafter, the processor 202 may utilize the identified one or more sentiments in each of the first portion of annotated first set of social media data to train one or more second classifiers. Further, in an embodiment, the processor 202 may utilize the trained one or more second classifiers to determine the one or more sentiments in the second portion of annotated first set of social media data. The one or more sentiments, determined for each of the annotated first set of social media data as described above, may correspond to the set of dialogue features.

Further, in an embodiment, the feature extraction processor 210 may be configured to determine the set of language features from each of the annotated first set of social media data associated with each of the one or more second categories. The set of language features may correspond to n-gram feature vectors generated from the annotated first set of social media data. Further, in an embodiment, the feature extraction processor 210 may be configured to generate the n-gram feature vectors from the annotated set of surrounding data and the annotated set of conversation data, separately. The value of "n" may lie between a range, such as between "1" to "5." Further, in an embodiment, one or more stopwords in each of the annotated first set of social media data, the annotated set of surrounding data, and the annotated set of conversation data may be considered while constructing the corresponding n-gram feature vectors. For example, in a post, such as "my wedding is scheduled in June," "my" is considered as stopword that may be considered while constructing an n-gram feature vector, as the stopwords helps in determining an association of the post, i.e., the one or more second categories.

Further, in an embodiment, the feature extraction processor 210 may be configured to determine the set of POS features from each of the annotated first set of social media data associated with each of the one or more second categories. The set of POS features may correspond to n-gram POS vectors that may be generated from each of the annotated first set of social media data. The processor 202 may utilize one or more standard toolkits known in the art, such as Stanford POS Tagger toolkit to obtain one or more POS tags for each of the annotated first set of social media data. Thereafter, the processor 202, in conjunction with the feature extraction processor 210, may generate the n-gram POS vectors by use of the one or more POS tags. The value of "n" may lie between a range, such as between "1" to "5."

Further, in an embodiment, the feature extraction processor 210 may be configured to determine the set of dependency features from each of the annotated first set of social media data associated with each of the one or more second categories. In an embodiment, each of the set of dependency features may be based on at least a dependency relationship among at least a plurality words in the annotated first set of social media data. The processor 202 may utilize one or more standard toolkits known in the art, such as Stanford Dependencies Parser toolkit, to determine the dependency relationship among the plurality of words in the annotated first set of social media data. After determining the dependency relationship, the processor 202, in conjunction with the feature extraction processor 210, may be configured to generate or construct two sets of dependency features, say a first set of dependency features and a second set of dependency features. The first set of dependency features is based on dependency phrases, i.e., bi-gram phrases are constructed following the dependency relations. For example, ("happy," "wedding"), ("we," "happy"), and/or the like. The second set of dependency features is based on the dependency relation. In such a case, in addition to the bi-gram phrases, the processor 202 may add the dependency relation types. For example, tmod("happy," "tomorrow") and nsubj("we," "happy"), where "tmod" is the relation called temporal modifier and "nsubj" is the relation called nominal subject.

Further, in an embodiment, the feature extraction processor 210 may be configured to determine the set of mention features from each of the annotated first set of social media data associated with each of the one or more second categories. In an embodiment, the set of mention features may be determined based on at least a mention of demographic attributes of one or more other users in the annotated first set of social media data. For example, the mention feature may be determined based on number of mentions of demographic attributes in the annotated first set of social media data. Further, the mention feature may be determined based on a position where the mentions of the demographic attributes appear in the annotated first set of social media data.

At step 310, the one or more first classifiers are trained based on the extracted set of features associated with each of the annotated first set of social media data. In an embodiment, the processor 202 may be configured to train the one or more first classifiers based on the extracted set of features associated with each of the annotated first set of social media data. Examples of the one or more first classifiers may include, but are not limited to, a Logistic Regression, a Random Forest (RF) model, a Gaussian Naive Bayes (Gaussian NB), a Bernauli Naive Bayes (Bernauli NB), and/or the like. The trained one or more first classifiers may be further utilized to determine the one or more second categories of the extracted second set of social media data of the one or more users that have been explained in conjunction with FIG. 4.

Figure 4:
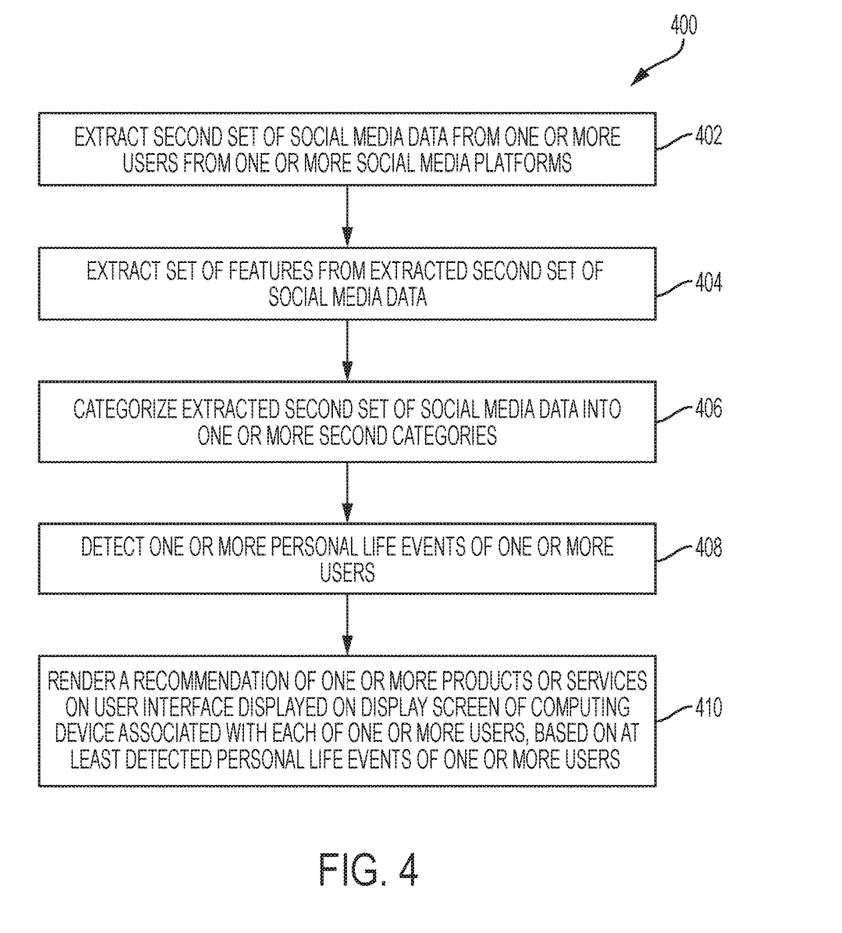
FIG. 4 is flowchart that illustrates a method for detecting personal life events of users, in accordance with at least one embodiment.

FIG. 4 is a flowchart that illustrates a method for detecting personal life events of users, in accordance with at least one embodiment. With reference to FIG. 4, there is shown a flowchart 400 that has been described in conjunction with FIG. 1, FIG. 2, and FIG. 3.

At step 402, the second set of social media data of each of the one or more users, is extracted from the one or more social media platforms. In an embodiment, the data extraction processor 208 may be configured to extract the second set of social media data from the one or more social media platforms, such as the social media platform server 110, over the communication network 114. The extracted second set of social media data may comprise one or more sets of social media data that are associated with the one or more users of the one or more social media platforms, such as Facebook™, LinkedIn™, Twitter™, Instagram™, Google+™, and/or the like. Further, the extracted second set of social media data may be associated with the one or more first categories. The one or more first categories may correspond to the one or more groups or classes that represent at least one of the one or more personal events, the one or more social events, and the one or more professional events. For example, the one or more first categories may be associated with marriage, education, employment, and/or the like.

In an embodiment, the data extraction processor 208 may be configured to extract the second set of social media data from the one or more social media platforms by use of the one or more keywords that are associated with the one or more first categories. For example, a first category correspond to a marriage-related event category. In such a case, one or more keywords may include one or more synonyms and one or more other words that are associated with the word "marriage." For example, "marriage," "wedding," "bride," "groom," and/or the like. The data extraction processor 208 may generate a search string or query based on such one or more keywords. Further, the data extraction processor 208 may transmit the generated search string or query to the one or more social media platforms, such as the social media platform server 110, over the communication network 114 to extract the second set of social media data. The extracted second set of social media data may comprise the set of surrounding data and the set of conversation data associated with the extracted second set of social media data.

At step 404, the set of features is extracted from each of the extracted second set of social media data. In an embodiment, the feature extraction processor 210 may be configured to extract the set of features from each of the extracted second set of social media data. The set of features extracted from each of the extracted second set of social media data may include one or more of the set of dialogue features, the set of language features, the set of POS features, the set of dependency features, and the set of mention features. In an embodiment, the feature extraction processor 210 may extract the set of features from each of the extracted second set of social media data in a similar manner, as discussed above in step 308 in FIG. 3.

At step 406, the extracted second set of social media data is categorized into the one or more second categories. In an embodiment, the processor 202 may be configured to categorize the extracted second set of social media data into the one or more second categories. In an embodiment, the processor 202 may categorize the extracted second set of social media data into the one or more second categories based on the extracted set of features of the extracted second set of social media data. Further, in an embodiment, the processor 202 may utilize the trained one or more first classifiers to determine the one or more second categories of the extracted second set of social media data.

At step 408, the one or more personal life events of the one or more users are detected. In an embodiment, the processor 202 may be configured to detect the one or more personal life events of the one or more users. In an embodiment, the processor 202 may detect the one or more personal life events of the one or more users based on the determined categories of the extracted second set of social media data. For example, a social media user, such as "user-1," posted a message on his/her social media profile, such as "TWITTER™." The message reads as "too much excited for my PhD in the United States from next month." Based on a set of features extracted from the posted message, the trained one or more first classifiers may categorize the posted message in a self-associated event category. In such a case, the processor 202 may determine from the posted message that the personal life event "education" is associated with the social media user.

At step 410, the recommendation of the one or more products or services is rendered on a user interface displayed on the display screen of the one or more user-computing devices, such as the user-computing device 102, based on the detected one or more personal life events. In an embodiment, the processor 202 may be configured to render the recommendation of the one or more products or services on the user interface displayed on the display screen of the user-computing device 102 associated with each of the one or more users. In an embodiment, the processor 202 may render the recommendation of the one or more products or services based on the detected one or more personal life events of the one or more users. For example, when the processor 202 determines that a social media user is getting married in near future, then in such a case, the processor 202 may recommend the one or more products or services (e.g., wedding outfits, wedding venues, jewelry, and/or the like) to the social media user.

The disclosed embodiments encompass numerous advantages. Various embodiments of the disclosure lead to a method and a system for detecting personal life events of users. Through various embodiments of the disclosure, the method discloses a method for training classifiers. The one or more classifiers are trained based on features extracted from a set of historical social media data and a set of surrounding data and a set of conversation data associated with the set of historical social media data. The trained classifiers are further utilized for classifying social media data into one or more categories, such as a self-associated event category, other-associated event category, or a generically-associated event category. The social media data (e.g., one or more messages, images, videos, and/or the like) may be posted, shared, liked, or disliked by one or more users on one or more social media platforms, such as Facebook™, LinkedIn™, Twitter™, Instagram™, Google+™, and/or the like. Based on the determined categories, one or more personal life events of the one or more users are detected. The detected one or more personal life events may be further utilized to transmit a recommendation of one or more products or services to the one or more users.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for detecting personal life events of users by a computing server have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for operating an event detection system to detect at least one event associated with an individual, the system comprising:
   a crowdsourcing platform;
   a communication network; and
   a computing server comprising a first processor, a data extraction processor, a feature extraction processor, and a transceiver, the method comprising:
   extracting, by the data extraction processor, a first set of social media data, associated with one or more first categories, from one or more social media platforms over the communication network;
   transmitting, by the transceiver, the extracted first set of social media data to one or more crowdworkers over the crowdsourcing platform;
   annotating the extracted first set of social media data based on one or more second categories by the one or more crowdworkers to form an annotated first set of social media data;
   receiving, by the transceiver, the annotated first set of social media data from the one or more crowdworkers over the crowdsourcing platform;
   extracting, by the feature extraction processor, a set of features from each of the annotated first set of social media data to form an extracted set of features, the extracted set of features including at least a set of dialogue features, a set of language features, a set of Part-of-Speech (POS) features, a set of dependency features, and a set of mention features, and wherein the set of dialogue features is indicative of at least one or more sentiments in the annotated first set of social media data;
   training, by the first processor, one or more first classifiers based on the extracted set of features associated with each of the annotated first set of social media data;
   extracting, by the data extraction processor, a second set of social media data of the individual, associated with the one or more first categories, from the one or more social media platforms over the communication network;
   sorting, by the first processor, the extracted second set of social media data into the one or more second categories by use of the trained one or more first classifiers, wherein the one or more second categories comprises at least one self-associated event category, each self-associated event category corresponding to a designated event; and
   detecting, by the first processor, the at least one event corresponding to the designated event of the at least one self-associated event category into which the extracted second set of social media data is sorted.

2. The method of claim 1, wherein the first set of social media data is extracted, by the data extraction processor, based on one or more keywords associated with the one or more first categories, and wherein the extracted first set of social media data corresponds to a predefined time period.

3. The method of claim 1, wherein the extracted first set of social media data further comprises a set of surrounding data and a set of conversation data associated with each of the first set of social media data.

4. The method of claim 1, wherein the one or more first categories are based on at least one or more personal events, social events, and/or professional events.

5. The method of claim 1, wherein each of the set of language features corresponds to an n-gram feature vector generated from each of the annotated first set of social media data.

6. The method of claim 1, wherein each of the set of POS features corresponds to an n-gram POS vectors generated from each of the annotated first set of social media data.

7. The method of claim 1, wherein each of the set of dependency features is based on at least a dependency relationship between at least a plurality words in the annotated first set of social media data.

8. The method of claim 1, wherein each of the set of mention features is based on at least a mention of demographic attributes of the one or more users in the annotated first set of social media data.

9. The method of claim 1 further comprising determining the set of dialogue features, the method comprising:
   segregating, by the processor, the annotated first set of social media data into a first portion of annotated first set of social media data and a second portion of annotated first set of social media data;
   transmitting, by the transceiver, the first portion of annotated first set of social media data to the one or more crowdworkers over the crowdsourcing platform;
   identifying the one or more sentiments in each of the first portion of annotated first set of social media data;
   receiving, by the transceiver, the identified one or more sentiments in the first portion of annotated first set of social media data from the one or more crowdworkers over the crowdsourcing platform;
   training, by the processor, one or more second classifiers based on the identified one or more sentiments in the first portion of annotated first set of social media data; and
   determining, by the processor, the one or more sentiments in the second portion of annotated first set of social media data by use of the trained one or more second classifiers.

10. The method of claim 1 further comprising rendering, by the processor, a recommendation of one or more products/services on a user interface displayed on a display screen of a computing device associated with the individual, based on at least the detected event.

11. An event detection system to detect at least one event associated with an individual, the system comprising:
   a crowdsourcing platform;
   a communication network;
   a transceiver; and
   one or more processors configured to:
   extract a first set of social media data, associated with one or more first categories, from one or more social media platforms over the communication network;
   transmit the extracted first set of social media data to one or more crowdworkers over the crowdsourcing platform;
   annotate the extracted first set of social media data based on one or more second categories by the one or more crowdworkers to form an annotated first set of social media data;
   receive, by the transceiver, the annotated first set of social media data from the one or more crowdworkers over the crowdsourcing platform;
   extract a set of features from each of the annotated first set of social media data to form an extracted set of features, the extracted set of features including at least a set of dialogue features, a set of language features, a set of Part-of-Speech (POS) features, a set of dependency features, and a set of mention features, and Wherein the set of dialogue features is indicative of at least one or more sentiments in the annotated first set of social media data;
   train one or more first classifiers based on the extracted set of features associated with each of the annotated first set of social media data;
   extract a second set of social media data of the individual, associated with the one or more first categories, from the one or more social media platforms over the communication network;
   sort the extracted second set of social media data into the one or more second categories by use of the trained one or more first classifiers, wherein the one or more second categories comprises at least one self-associated event category, each self-associated event category corresponding to a designated event; and
   detect the at least one event corresponding to the designated event of the at least one self-associated event category into which the extracted second set of social media data is sorted.

12. The system of claim 11, wherein the one or more first categories are based on at least one or more personal events, social events, and/or professional events.

13. The system of claim 11, wherein the one or more processors are further configured to render a recommendation of one or more products/services on a user interface displayed on a display screen of a computing device associated with the individual, based on at least the detected event.

14. A computer program product for use with an event detection system, the computer program product comprising a non-transitory computer readable medium, the non-transitory compute readable medium storing a computer program code to detect at least one event associated with an individual, the system comprising at least one processor, a crowdsourcing platform, a communication network, and a transceiver, wherein the computer program code is executable by the at least one processor to:
   extract a first set of social media data, associated with one or more first categories, from one or more social media platforms over the communication network, wherein the one or more first categories are based on at least one or more personal events, social events, and/or professional events;
   transmit the extracted first set of social media data to one or more crowdworkers over the crowdsourcing platform;
   annotate the extracted first set of social media data based on one or more second categories by the one or more crowdworkers to form an annotated first set of social media data;
   receive, by the transceiver, the annotated first set of social media data from the one or more crowdworkers over the crowdsourcing platform;
   extract a set of features from each of the annotated first set of social media data to form an extracted set of features, the extracted set of features including at least a set of dialogue features, a set of language features, a set of Part-of-Speech (POS) features, a set of dependency features, and a set of mention features, and wherein the set of dialogue features is indicative of at least one or more sentiments in the annotated first set of social media data;

train one or more first classifiers based on the extracted set of features associated with each of the annotated first set of social media data;

extract a second set of social media data of the individual, associated with the one or more first categories, from the one or more social media platforms over the communication network;

sort the extracted second set of social media data into the one or more second categories by use of the trained one or more first classifiers, wherein the one or more second categories comprises at least one self-associated event category, each self-associated event category corresponding to a designated event; and detect the at least one event corresponding to the designated event of the at least one self-associated event category into which the extracted second set of social media data is sorted.

15. The method of claim 1, wherein the at least one event comprises a wedding or related event.

16. The method of claim 1, wherein the at least one event comprises a graduation or related event.

17. The method of claim 1, wherein the at least one event comprises an employment or related event.

18. The system of claim 11, wherein the at least one event comprises a wedding or related event.

19. The system of claim 11, wherein the at least one event comprises a graduation or related event.

20. The system of claim 11, wherein the at least one event comprises an employment or related event.

* * * * *